No. 625,072. Patented May 16, 1899.
M. S. TRUMBO.
FOOD COOKING APPARATUS.
(Application filed Sept. 12, 1898.)
(No Model.)

WITNESSES:
J. W. French
A. L. Phelps

INVENTOR
Morgan S. Trumbo
BY
C. C. Shepherd
ATTORNEY

UNITED STATES PATENT OFFICE.

MORGAN S. TRUMBO, OF GAHANNA, OHIO.

FOOD-COOKING APPARATUS.

SPECIFICATION forming part of Letters Patent No. 625,072, dated May 16, 1899.

Application filed September 12, 1898. Serial No. 690,739. (No model.)

*To all whom it may concern:*

Be it known that I, MORGAN S. TRUMBO, a citizen of the United States, residing at Gahanna, in the county of Franklin and State of Ohio, have invented a certain new and useful Improvement in Food-Cooking Apparatus, of which the following is a specification.

My invention relates to the improvement of food-cookers, and has particular relation to that class of food-cookers which are adapted for heating and cooking food for live stock.

The objects of my invention are to so construct and arrange the parts of a cooking apparatus of this character as to insure a rapid and thorough cooking of the food, to combine with said cooking apparatus means for conveying the cooked food to the place of use, and to produce other improvements in details of construction and arrangement of parts, which will be more fully pointed out hereinafter. These objects I accomplish in the manner illustrated in the accompanying drawings, in which—

Figure 1:
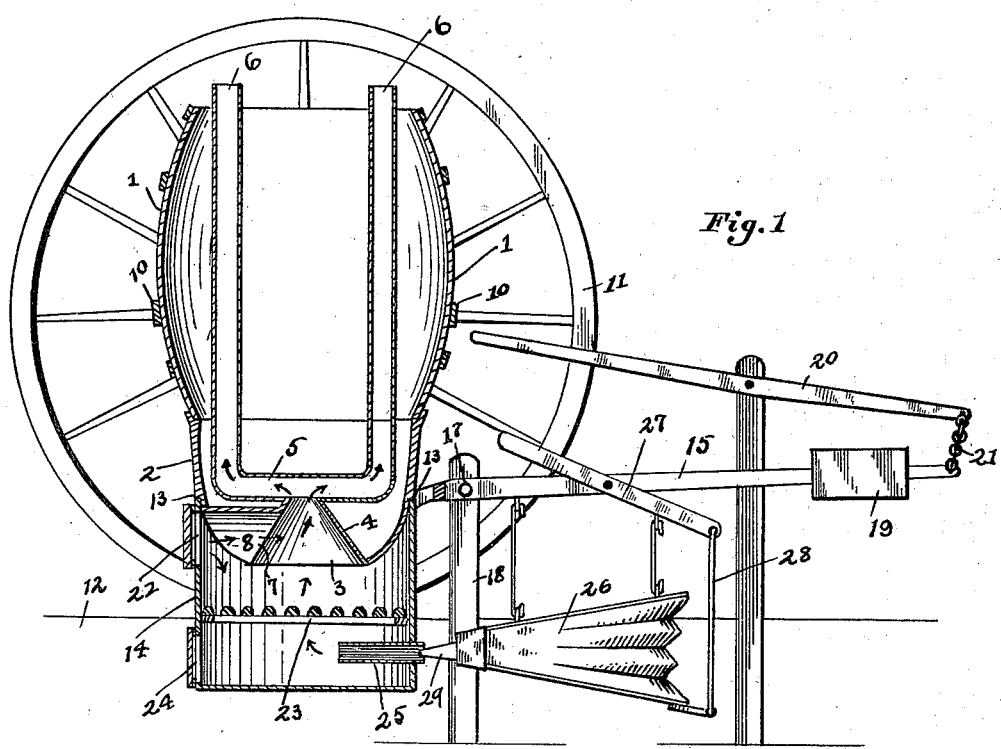
Figure 2:
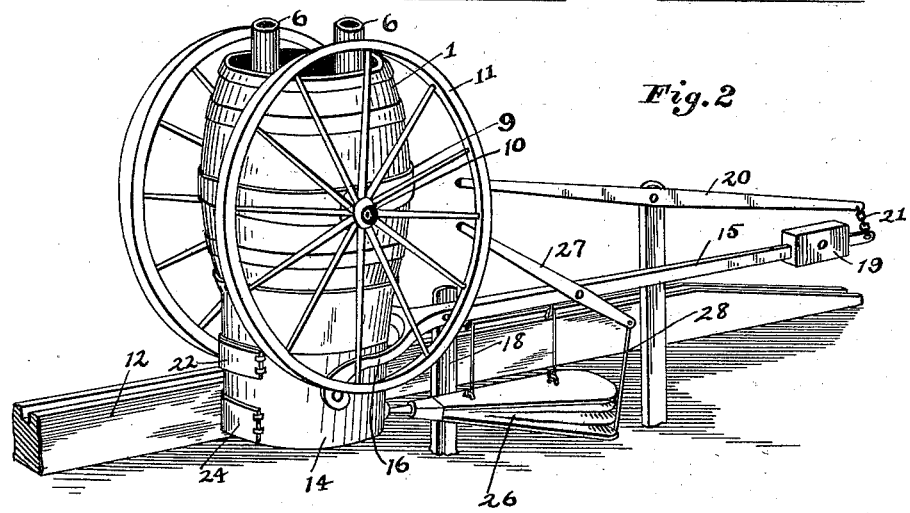

Figure 1 is a central vertical section of my improved cooking apparatus, and Fig. 2 is a view in perspective of the same.

Similar numerals refer to similar parts throughout both views.

In carrying out my invention I employ a barrel-shaped body 1, of wood or other suitable light material, said barrel having its upper and lower end portions open, as shown. Secured to and depending from the lower end of the barrel-body 1 is a metallic kettle 2, the under side of said kettle having a central opening 3 therein, from about which leads upward within the kettle a short conical flue 4. The upper and inner end of the flue 4 communicates within the kettle-body with the central portion of a horizontal flue-arm 5, the latter serving to connect the lower ends of upwardly-extending outlet-pipes 6, which pass through the barrel-body, as shown. In the forward side of the lower portion of the kettle-body I provide an opening, which is indicated at 7, said opening being continued in the form of a passage 8 inward through one side of the conical flue 4.

In the construction of the barrel-body I provide the same with an encircling band 9, from opposite points on which project outwardly trunnions or spindles 10, on which are rotatably mounted ground-wheels 11. As shown in the drawings, these wheels 11 are adapted to bear and travel upon two parallel track-sections 12.

In the formation of the kettle-body 2 I produce a peripheral shoulder 13, against which is adapted to abut the upper end of a cylindrical fire-box 14. As indicated in the drawings, this fire-box is adjustably supported by an outwardly-extending lever 15, the arms 16, produced by the bifurcation of one end of said lever, embracing and being pivoted to opposite sides of the fire-box. The lever 15 is, as indicated at 17, fulcrumed to a frame-standard 18, the outwardly-extending end portion of said lever being sufficiently weighted, as indicated at 19, to normally elevate the fire-box 14. In order to lower said fire-box, I provide a fulcrumed lifting-lever 20, one end of which is, through the medium of a chain 21, connected with the outer end of the lever-arm 15. As indicated at 22, I provide the forward side of the fire-box, in its upper portion and at a point immediately opposite the opening 7 in the kettle, with a doorway and door. At a suitable point within the fire-box I provide a transverse grate-bar 23, and opening into the usual space beneath said grate-bar is a door 24. I preferably provide the ash-box with a rearwardly-extending pipe-section 25.

26 represents a suitable form of bellows which is suspended beneath the lever-arm 15 partially from the latter and partially from a bellows-operating lever 27, said lever 27 being fulcrumed to the lever-arm 15 and having its outer end jointedly connected with the lower portion of the bellows-body through the medium of a connecting-rod 28. The discharging-nozzle 29 of the bellows is adapted, as shown, to be projected into the mouth of the pipe-section 25.

In utilizing my invention the material to be cooked or heated is introduced into the barrel and kettle through the upper end portion of the former, the material thus introduced surrounding the pipes 5 and 6, cone 4, and passage 8. The ground-wheels 11 of the apparatus having been run upon the supporting track-sections 12, the fire is built upon the grate-bars 23, the material to feed the same being fed inward through the doorway 22. Owing to the formation of the passage 8, it is obvious that the material thus fed into the fire-box may extend partially into the cone 4 and the fire thus be brought into direct contact with the inner surfaces of said cone and passage, as well as with the bottom of the kettle. Owing to the fact that the food or material to be cooked is immediately about the conical neck portion 4, passage 8, and outlet-flues 5 and 6, it is obvious that said food will be subjected to the direct heat of the fire and will be rapidly and uniformly cooked. During the cooking operation the heat of the fire may be greatly increased by the manipulation of the bellows-operating lever 27, which must result in the discharge of a strong current of air into the fire-box beneath the grate-bars. The food having been properly cooked, a downward pressure on the forward end portion of the lever 20 will result in the disengagement of the fire-box and kettle and permit of the remainder of the apparatus being run off the supporting track-sections and wheeled to the point of use. It will thus be seen that not only are superior means provided for cooking food for live stock or other purposes, but that means are provided in conjunction therewith for the delivery of the cooked product to the place of use.

Having now fully described my invention, what I claim, and desire to secure by Letters Patent, is—

1. In a food-cooking apparatus, the combination with a barrel-body 1, a kettle depending therefrom, an opening in the bottom of said kettle, a flue extending upward within the kettle about said opening, and outlet-flues 6 communicating with said kettle-flue, of a fire-box adapted to be supported beneath said kettle and detachably connected therewith, substantially as and for the purpose specified.

2. In a food-cooking apparatus, the combination with a barrel-body 1, a metallic kettle depending therefrom, separated vertical flues extending through said barrel-body and into said kettle portion, a conical flue 4 extending through the lower portion of said kettle-body and a lateral passage 8 leading outward therefrom, a vertically-adjustable fire-box adapted to be supported beneath the kettle-body and ground-wheels journaled on opposite sides of said barrel-body, substantially as and for the purpose specified.

MORGAN S. TRUMBO.

In presence of—
C. C. SHEPHERD,
W. L. MORROW.